Jan. 28, 1969 T. BUDZICH 3,423,935
HYDRAULIC CONTROL SYSTEM FOR TRACTOR DRAWN IMPLEMENT
Filed Dec. 30, 1966 Sheet 1 of 3
Fig. 1
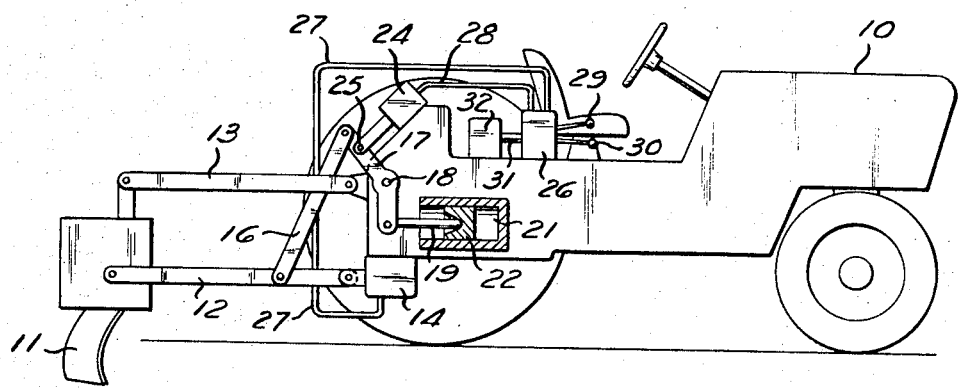
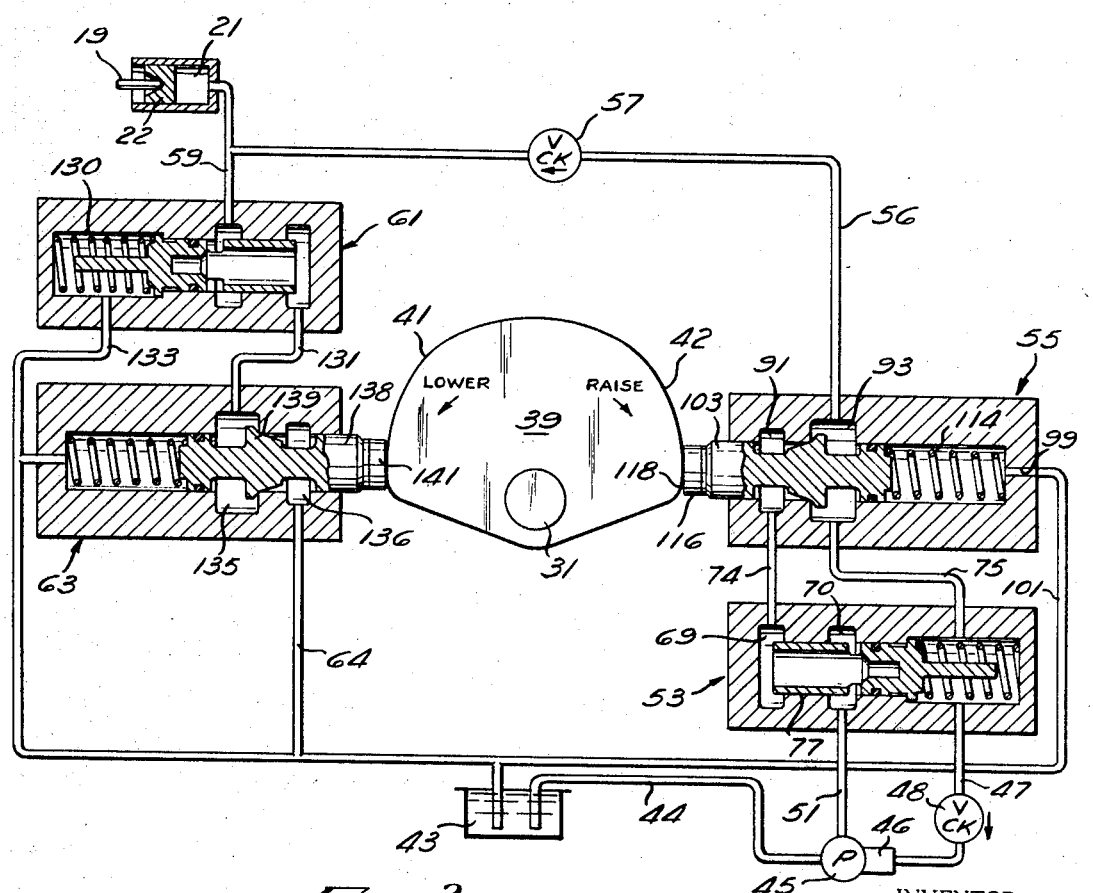
Fig. 2
INVENTOR.
TADEUSZ BUDZICH
BY
McNENNY, FARRINGTON, PEARNE, & GORDON
ATTORNEYS Jan. 28, 1969    T. BUDZICH    3,423,935
HYDRAULIC CONTROL SYSTEM FOR TRACTOR DRAWN IMPLEMENT
Filed Dec. 30, 1966    Sheet 2 of 3

INVENTOR.
TADEUSZ BUDZICH
BY
McNENNY, FARRINGTON, PEARNE, & GORDON
R. H. Dickinson Jr.
ATTORNEYS

United States Patent Office 3,423,935
Patented Jan. 28, 1969

3,423,935
HYDRAULIC CONTROL SYSTEM FOR TRACTOR DRAWN IMPLEMENT
Tadeusz Budzich, Moreland Hills, Ohio, assignor to The Weatherhead Company, Cleveland, Ohio, a corporation of Ohio
Filed Dec. 30, 1966, Ser. No. 606,367
U.S. Cl. 60—52
Int. Cl. F15b *13/04, 15/18;* A01b *3/36*
15 Claims

ABSTRACT OF THE DISCLOSURE

A hydraulic draft control system for a single acting draft cylinder having separate flow circuits for fluid supply to and from the cylinder. Each circuit has a balanced poppet control valve and a differential pressure regulator, and a linkage operated shaft has separate cam surfaces for actuating the control valves with one control valve arranged to provide a feedback signal for controlling a variable displacement pump. One cam surface may have a movable member thereon to vary the cam surface profile depending upon the direction of cam movement.

---

This invention relates generally to hydraulic servo systems and more particularly to hydraulic servo control systems particularly adapted as implement controls for agricultural tractors.

Controls for tractor drawn implements generally fall into two categories. One type of control is a position control which operates to maintain the implement in a certain specific position with respect to the tractor and therefore the ground level, so that, in the case of a plow, a furrow is made at a constant depth regardless of the ground conditions. Another type of control is a draft control which is responsive to the resistance encountered by the plow and therefore acts to raise or lower the implement depending upon the resistance encountered so as to maintain a constant resistance and hence draw bar pull by the tractor.

It has been recognized that it is desirable to incorporate both types of controls into modern tractors so that the operator can select the type of control to be used, often with interlocking arrangements so as to allow one control to override the other depending upon the circumstances encountered. For example, the control can be operated using the position control with the draft control set at the maximum draw bar pull so that the position will change by raising the plow only if it encounters a resistance equal to or greater than the draw bar pull of the tractor to prevent the tractor stalling. On the other hand, the position control can be used to prevent plow under draft control from going excessively deep under soft soil conditions.

For these reasons, it has become common practice to mount the implement on a suitable linkage, preferably of the parallelogram type, which is attached to the rear of the tractor frame. Because the implement usually has sufficient weight to provide all the lowering force necessary, a single acting hydraulic cylinder may be used to apply the necessary upward force to raise the implement and to maintain it at the desired depth. By the use of a resilient mounting, means can be arranged to sense the draft force, and other means can be used responsive to the linkage for determining the position of the implement. Therefore, accurate control of the fluid in the single acting hydraulic cylinder serves to position the piston of the cylinder and thereby the position of the implement with respect to the tractor. By providing a draft responsive control, fluid is either supplied to or drained from the cylinder to change its position to maintain a constant draft force, and by the position control, the position of the linkage can be detected and also used to control the fluid within cylinder and thereby position the implement.

In recent years, agricultural tractors have become increasingly larger in size and power and have become complex machinery incorporating a number of different power controls such as for brakes, differential locks, steering, and additional attachments as well as the position and draft controls. This creates a complex hydraulic system which has heretofore necessitated the use of several hydraulic pumps for several circuits or else a rather complex arrangement of interrelated flow control and demand responsive valves to insure that such hydraulic units as the draft control will continue to operate reliably at all times despite intermittent or continuing demand by other loads in the hydraulic systems.

It is therefore a principal object of this invention to provide a novel and improved hydraulic control circuit for a single acting implement control cylinder.

It is another object of this invention to provide a novel and improved control system for an implement in which the response of the implement to a control signal is proportional to the magnitude of the control signal.

It is another object of this invention to provide a novel and improved hydraulic control system including a valve for controlling the operation of the single acting hydraulic cylinder which will supply a flow to and from the cylinder proportional to the control signal and constant for any specific signal level.

It is another object of this invention to provide a novel and improved hydraulic implement control system which is particularly adapted for use in a central hydraulic system having a plurality of other loads and driven by a variable displacement pump in which the implement control is able to provide a signal regulating the pump displacement to allow the pump to operate at a level where it supplies only the necessary output required by the loads in the system.

It is another object of this invention to provide a novel and improved hydraulic control system for an implement control which employs separate valve circuits to control the fluid flow to and from the single acting implement control motor for raising and lowering the implement.

It is another object of this invention to provide a novel and improved hydraulic control system which for small power corrections will provide power adjustment of the implement using a supply pressure lower than that required by the load.

It is another object of this invention to provide a novel and improved hydraulic control system for an implement control which provides fast response with minimum leakage so as to minimize the tendency of the system to hunt or oscillate between the raising and lowering conditions.

It is another object of this invention to provide a novel and improved hydraulic system for an implement control which is adaptable to allow selective addition of various control features as required by the particular application of the circuit.

It is still another object of this invention to provide a novel and improved hydraulic control system for an implement control which is arranged under a raise control signal to position the implement at the upper end of the dead band between the raise and lower valve response positions so that by taking advantage of the low leakage of the system, the drift time is relatively long before additional make up fluid is required from the pump to restore the implement to the controlled position.

It is still another object of this invention to provide a novel and improved hydraulic control system as set forth in the preceeding object which provides low leakage in the dead band range.

It is a further object of this invention to provide a novel and improved hydraulic control system for an implement control which is simple in arrangement to allow low cost of production while retaining a flexibility of features while minimizing mechanical linkages and using simple hydraulic components for high durability and long life.

The foregoing and further objects and advantages of this invention are obtained in an arrangement which, briefly described, employs a rotatable shaft which is moved angularly in response to the draft and position controls. The shaft has mounted on it a cam arrangement which is used to operate separate balanced poppet type valves which are connected to a check valve arrangement and separate differential pressure regulators to the single acting hydraulic cylinder so as to provide separate fluid flow paths for the fluid entering and leaving the cylinder. With this separate valve arrangement precise adjustment of the dead band and accurate control under minimum signals can be obtained and the raise control valve is adapted to provide a signal to the displacement control of the variable displacement pump so as to increase the output pressure and volume from such pump upon demand of the system. The use of the separate raise and lower circuits allows optional use of a pressure intensifier in the raise circuit to provide a supply pressure directly to the implement control cylinder which is greater than the output pressure of the pump. Likewise the cam can be arranged with optional features such as a lost motion cam finger which insures that the implement will be positioned at the top of the dead band after the raise connection has been made but which will allow gradual drift through the dead band before the next raise connection is made, thus permitting longer periods in which the power source is inoperative.

The foregoing and additional features and advantages of this invention will become apparent from the following detailed description of the preferred embodiments of the invention as shown in the accompanying drawings in which:

FIGURE 1 is a schematic representation of an implement control system using the present invention as applied to a tractor drawn plow;

FIGURE 2 is a schematic circuit diagram of an implement control hydraulic system according to the preferred embodiment of the present invention;

Figure 3:
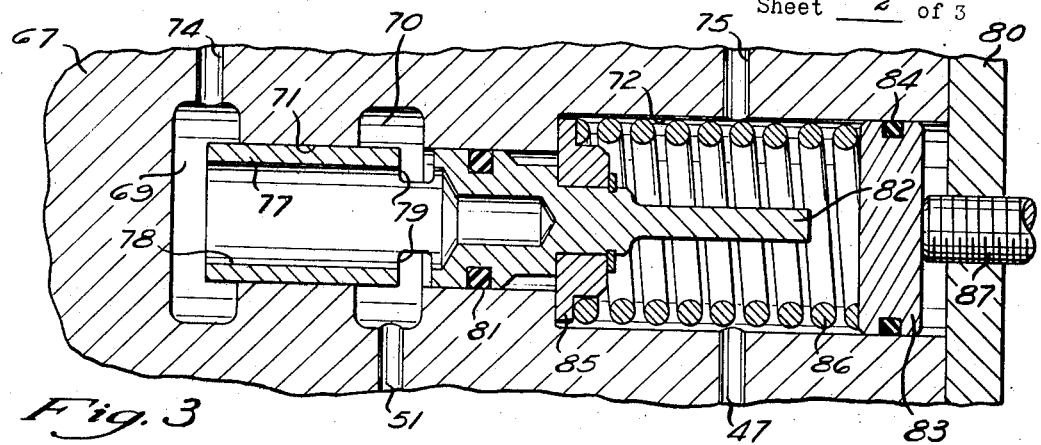
FIGURE 3 is an enlarged fragmentary cross-sectional view showing the differential pressure regulator of FIGURE 2.

Referring now to the drawings in greater detail, FIGURE 1 shows the present invention as applied to a control for a hydraulically operated implement such as a plow attached to an agricultural tractor. As shown, the tractor 10 may be of any usual type in which the engine also operates a hydraulic pump as will be discussed in greater detail hereinafter. The plow 11 is attached to the tractor 10 by means of a parallelogram linkage formed by upper and lower links 12 and 13. The mount for the lower link 12 includes a draft force sensor 14 which may include a spring to allow yield under the load encountered by the plow.

A control link 16 is pivotally secured to the lower link 12 intermediate its ends and at its upper end is attached to a crank 17 pivotally journalled on the tractor frame as at 18. The other end of crank 17 is attached to a push rod 19 connected in turn to a piston 22 in a single acting hydraulic cylinder 21. Thus, it will be seen that the control of the amount of fluid in the cylinder 21 determines the position of piston 22 and hence by its action through the push rod 19 and crank 17 moves the control link 16 upwards or downwards to raise or lower the plow 11 as desired for the selected depth.

A position sensor 24 is mounted on the tractor frame and connected as at 25 to the crank 17 to produce an output signal which is responsive only to the position of the implement or plow 11 as determined by the action of the hydraulic cylinder 21. A control box unit 26 is mounted on the tractor in a position convenient to the operator and is connected by a first signal transmission means 27 to the draft sensor 14 and by a second signal transmission means 28 to the position sensor 24. The control box 26 is provided with levers 29 and 30 to allow the operator to operate the position and draft controls respectively. It will be understood that the sensors 14 and 24 may be a mechanical linkage, a cable, an electrical transducer or hydraulic means and the signal transmitting means 27 and 28 are appropriate depending upon the type of transducer for transmitting the signal to the control box 26, so that the mechanism therein may operate responsive to the signals from the draft and position sensors to provide a rotational signal to a shaft 31. The shaft 31 interconnects the control box 26 and the control valve unit shown at 32. It will be understood that the construction of the tractor, the implement and implement mounting arrangement, as well as the position and draft sensors and the structure within the control box 26 form no part of the present invention except as herein described, since the present invention is directed to the hydraulic system operated by rotation of the shaft 31.

The details of the control valve structure which is mounted within the housing 32 and actuated by means of rotation of the shaft 31 are shown in greater detail in FIGURE 2. This valve mechanism may be mounted in any convenient manner within the control housing 32 and includes a radial cam member 39 connected to the shaft 31 to rotate therewith.

The cam 39 has on one portion of its periphery a lowering or lower cam surface 41 and on the other side a raising or raise cam surface 42, each of which is formed with an increasing radius when the cam 39 is rotated as shown in FIGURE 2, counter clockwise in the case of the lower cam surface and clockwise in the case of the raise cam surface. It will be understood, however, that the cam surfaces 41 and 42 can be on two separate cam members attached to the shaft 31 if it is desirable to locate the valves controlled by such cam surfaces axially along the cam shaft as long as the two cam surfaces 41 and 42 meet the above requirement as to shape and are rigidly connected to the shaft so as to prevent rotation of one cam surface relative to the other or to the shaft.

The hydraulic system includes a fluid reservoir 43 from which fluid is pumped through a supply line 44 to a pump 45. The pump 45 is of the positive variable displacement type and is provided with a control 46 for varying the output volume and pressure of the pump as required by the system. While the control valve arrangement of this invention is operable from any source of fluid pressure having sufficient volume of flow and pressure to operate the system, it is preferably supplied by a pump having a load or demand responsive control so that the output pressure of the pump and hence the output volume of the pump is regulated to the demand of the system. Thus, the pump control 46 for changing the displacement of the pump is supplied with fluid through a control line 47 and check valve 48 to respond in such a manner that increasing pressure in the line 47 operates to increase the output displacement and pressure of the pump to maintain a pressure level above that in line 47 and this system is arranged to provide such a feedback signal to operate the pump in this manner. Such a pump control is preferably constructed as shown in my co-pending application Ser. No. 613,533, filed Feb. 2, 1967 although it is recognized that other load responsive type pumps and pump controls may be used.

The control valve arangement utilizes separate fluid paths for raising or supplying additional fluid to the hydraulic cylinder 21 and for lowering or discharging fluid from the cylinder 21 back to the reservoir. Thus, for raising, the fluid is supplied through a line 51 from the pump 45 first to a differential pressure regulator 53 which in turn supplies the fluid to a balanced poppet type raise control valve 55 which is connected through line 56 and check valve 57 to the cylinder 21.

The purpose of the check valve 57 is to prevent a reverse flow of fluid back to the raise control valve 55 under lowering or stable conditions both to prevent flow in this direction and to prevent a high pressure signal from being transmitted to the pump control 46. For lowering, the fluid is exhausted from the hydraulic cylinder 21 through a line 59 to the lower differential pressure regulator 61 which in turn supplies the fluid to the lower control valve 63 which in turn is connected by a line 64 back to the reservoir 43.

With minor exceptions as will be described hereinafter, the pressure regulating and control valves are substantially identical for both the raising and lowering circuits, and the differential pressure regulating valve in each case functions to regulate the pressure differential across the poppet and valve seat in the respective control valve.

The raise differential pressure regulator 53 is shown in greater detail in FIGURE 3 and includes a housing 67 having a pair of spaced cored chambers 69 and 70 therein which are connected by a bore 71 which extends from the left chamber 69 past the chamber 70 and terminates in an enlarged counterbore 72. As shown in FIGURE 2, the line 51 from the pump 45 opens into the right chamber 70 while the left chamber 69 is connected by another line 74 to the raise control valve 55. A second line 75 also connects the raise control valve 59 with the counterbore 72 which is also connected by the control line 47 to the pump control 46.

A valve piston 77 is slidably mounted within the bore 71 and has an internal axial passage 78 therein which opens into the left chamber 69. Also, the passage 78 is connected by means of ports 79 to the chamber 70 so that movement of the piston 77 toward the right as shown in FIGURE 3 results in decreasing the effective area of the ports 79 in communication with the chamber 70. Thus, with this arrangement by controlling the position of the valve piston 77, the effective fluid communication between the chambers 69 and 70 can be controlled to regulate the rate of fluid flow therebetween. The piston 77 carries a seal 81 to make sealing contact with the bore 71 between the chamber 70 and the piston extends into the counterbore 72 where it has a projection 82 which acts as a stop to limit movement of the piston 77 to the right. The piston 77 carries a flanged member 85 within the counterbore 72 which serves as one seat for a compression spring 86 which abuts at its other end against a plunger 83 which carries an O-ring seal 84 to make sealing contact with the wall of counterbore 72. The plunger 83 is adjustably positioned in counterbore 72 by an adjusting screw which is threadedly engaged in the end wall 80 closing off the counterbore 72. Thus, the spring 86 serves to provide a continuous biasing force, the magnitude of which is determined by the position of plunger 83, acting on the valve piston 77 tending to force it to the left so as to result in the maximum area for the ports 79. This allows the valve to act as a differential regulator since the force tending to move the piston 77 to the right is equal to the pressure within the left chamber 69 times the effective area of the piston 77 and bore 71 while the forces tending to bias the piston 77 toward the left constitute the force of the spring 86 and the fluid pressure within the counterbore 72 as determined by the pressure in line 75. Since the line 74 is connected to chamber 69 and both line 74 and line 75 communicate with the raise control valve 55, the operation of the differential regulating valve is to maintain a constant pressure differential between the lines 74 and 75, with the higher pressure in line 74 being determined by the biasing force of the spring 86. Thus, this pressure differential remains substantially constant and is independent of the absolute pressures in the lines.

Figure 4:
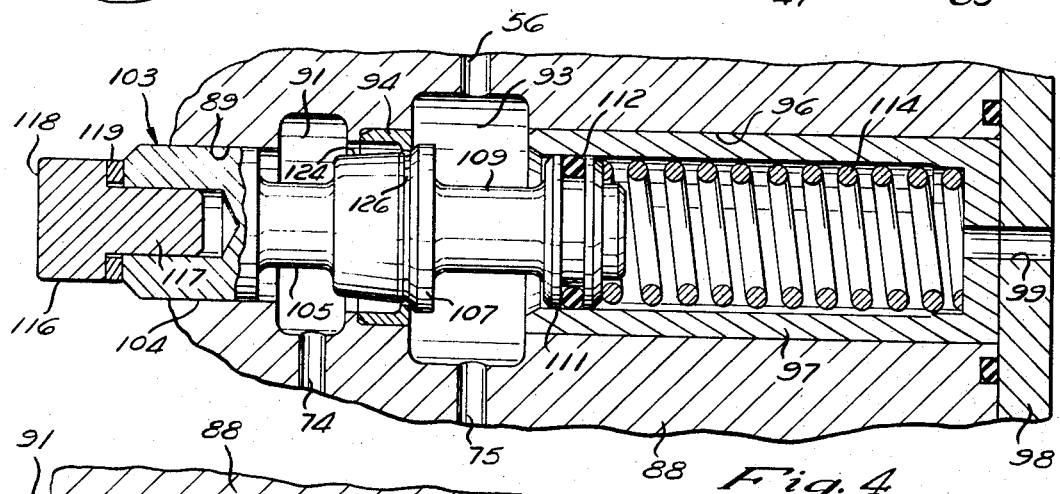
FIGURE 4 is an enlarged fragmentary cross-sectional view showing the balanced poppet valve as shown in FIGURE 2.

The structure of the raise control valve 55 is shown in greater detail in FIGURE 4. The valve includes a housing 88, which may or may not be integral with the differential pressure regulator housing 67. Within housing 88 is a bore 89 extending radially away from the raise cam surface 42 which opens into an enlarged cored left chamber 91. Further along the bore 89 is another enlarged chamber 93 which is interconnected with the left chamber 91 by an opening within which is mounted a valve seat member 94. On the other side of the right chamber 93 is a larger bore 96 within which is mounted a sleeve 97 positioned by end plate 98. A drain passage 99 extends through the sleeve member 97 and end plate 98 and is connected by a line 101 back to the reservoir 43. It will be seen that the line 74 from the differential regulator opens into the left chamber 91, while the other line 75 from the differential pressure regulator opens into the right chamber 93, to which is also connected the line 56 which transmits the fluid through the check valve 57 to the hydraulic cylinder 21.

The control valve has a valve spool 103 mounted within the housing 88 and having a bearing portion 104 slidably fitted with a sealing fit within the bore 89. Spool 103 has a reduced portion 105 between the bearing portion and a poppet portion 107 which is adapted to cooperate with the valve seat member 94 so as to regulate the fluid flow between the chambers 91 and 93. On the other side of poppet 107 is another reduced neck 109 which terminates in a piston portion 111 which is slidably journalled within the sleeve 97 and carries an O-ring seal 112 to make sealing contact therewith. To provide the necessary biasing force tending to force the valve spool 103 toward the left as shown in FIGURE 4 a helical compression spring 114 is mounted within the sleeve 97 between the end of the sleeve and the piston portion 111. At the other end of the valve spool to allow actuation thereof by the cam 39 is a follower member 116 having a shank 117 received within a bore in the bearing portion 104. The follower member 116 carries a contacting surface 118 adapted to make contact with the raise cam surface 42, and a suitable shim 119 is provided between the follower member 116 and the end of the valve spool 103 for adjustment purposes so that the engagement between the poppet portion 107 and the valve seat 94 may be regulated for the desired position between the cam surface and the follower member.

Figure 5:
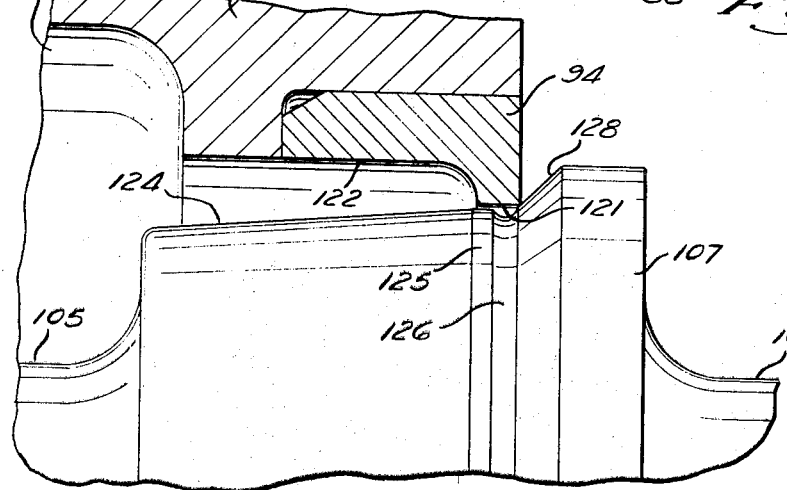
FIGURE 5 is a further enlarged fragmentary cross-sectional view showing additional details of the construction of the poppet and valve seat in the balanced poppet valve of FIGURE 4.

The poppet portion 107 has a construction arranged for metered control of the fluid flow between the chambers 91 and 93. As is shown in greater detail in FIGURE 5, the valve seat 94 is in the form of an insert within the housing 88 and on the side adjacent the chamber 93 has a cylindrical metering orifice portion 121, away from which the opening is enlarged at 122 to allow free fluid flow up to the metering opening 121. The poppet portion 107 has a conical metering surface 124 extending away from the reduced portion 105, and this metering surface 124 terminates at its larger end in a cylindrical surface 125 slightly smaller in diameter than that of the orifice opening 121 and generally positioned therein when the poppet is closed. On the other side of the cylindrical surface 125 is a relief groove 126, and beyond that a flared conical sealing surface 128.

It will be understood that the diameter of the metering opening 121 is the same as the diameter of the bore 89 and the interior of the sleeve 97. This insures that the effective areas exposed to fluid pressure within the chambers 91 and 93, that is, on the bearing portion 104, the effective sealing diameter of the sealing surface 128 where it engages with a line contact against the edge of the metering opening 121, and the effective diameter of the piston portion 111 within the sleeve 97, are all the same so that there are no fluid pressure biasing forces exerted upon the valve spool 103. Thus, since the chamber within the sleeve 97 is at drain pressure at all times, the spring 114 provides a controlled biasing force holding the follower member 116 in contact with the cam surface 42 so that upon rotation of the shaft 31 and cam 39, the increasing radius of the cam surface 42 as the cam 39 turns in a clockwise direction as shown in FIGURE 2 will gradually force the spool 103 to the right so that the sealing surface 128 moves away from the metering opening 121.

When the cam 39 is in a neutral position, both of the valve spools are positioned with the sealing surface in engagement with the valve seats and the follower portions are spaced away from the respective cam surfaces so that the cam must be rotated through a preliminary angular distance in each direction before the respective valve is opened to allow initial flow through the valve. This range of movement defines the dead band range and can be adjusted by the thickness of the shims 119. Initial opening of the valve results in a relatively small flow rate which tends to become constant because the effective opening remains substantially constant as long as the cylindrical surface 125 is within the metering opening 121. However, when the valve spool is moved such a distance that the cylindrical surface 125 passes into the chamber 93 then the effective area of the opening within the metering opening 121 is determined by the conical metering surface 124 which is tapered so that increasing movement of the valve spool 103 toward the right increases the effective area of the orifice. Since the differential pressure regulator 53 maintains a substantially constant pressure differential between the chambers 91 and 93, the rate of fluid flow into the chamber 93 is dependent solely upon the position of the valve spool 103 and independent of the absolute pressure. Thus, depending upon the shape of the cam surface 42, the rate of fluid flow into the chamber 93 and hence out line 56 to the hydraulic cylinder 21 becomes solely a function of the position and shape of the cam surface 42 and hence the position of the rotatable shaft 31.

Returning now to FIGURE 2, the foregoing arrangement provides for the controlled flow of fluid through the line 56 and the check valve 57 into the hydraulic cylinder 21. However, when the cam 39 is rotated in the counter clockwise direction, the lower control valve 63 opens to exhaust fluid from the hydraulic cylinder 21. Since the fluid cannot pass back into line 56 because of check valve 57, it is drained into line 59 which is connected to the lower differential pressure regulator 61. This regulator is constructed substantially the same as the raise differential pressure regulator 53 except it does not need the additional passage to provide a control signal to the pump. However, since the spring chamber 130 of the lower differential pressure regulator 61 is connected through a drain line 133 back to the reservoir 43, the output of this pressure regulator through the line 131 will always be at a constant pressure above reservoir pressure rather than at a constant pressure differential at a varying absolute pressure as occurs in the raise circuit.

The lower control valve 63 is constructed substantially the same as the raise control valve 55 except it does not have a port corresponding to the feedback line 75 to provide a pump control signal. Thus, the lower control valve 63 has a left chamber 135 corresponding to the right chamber 93 of the raise control valve 55 which is supplied with fluid through a line 131 from the lowering differential pressure regulator 61. As previously stated, line 131 will be at a constant relatively low pressure above reservoir pressure and its flow into a right chamber 136 is controlled by a valve spool 138 having a metering poppet 139 constructed in the same manner as the raise metering poppet 107. The spool 138 also has a cam follower portion 141 engageable with the lower cam surface 41, and in turn the right chamber 136 is connected to the reservoir 43 through drain line 64, while the spring chamber 143 is connected to the drain line 133.

Turning now to the description of the operation of the complete circuit, the operator moves the control levers 29 and 30 to set the desired position and draft controls for the plow. The control box 26 operates in response to the control levers to rotate the shaft 31 to a predetermined position of the cam 39, which then actuates the control valves to move the plow to the desired position.

FIGURE 2 shows the cam 39 in a neutral position, and in this position both the followers 116 and 141 are in engagement with the cam surfaces 42 and 41 respectively and the valve spools 103 and 138 are both in the closed positions within the dead band of the valve so that there is no flow through either valve. When it is intended to lower the plow, rotation of the shaft 31 and hence cam 39 in a counter clockwise direction as seen in FIGURE 2 results in rotating the cam surface 41 so as to open the lower control valve 63 thereby exhausing fluid in a controlled manner from the hydraulic cylinder 21 so that the weight of the plow causes it to drop to the desired depth. When it reaches this depth, the position sensor 24 sends a signal to the control box 26 to return the shaft 31 to the neutral position within the dead band as shown in FIGURE 2 to maintain the desired plow depth setting determined by the levers 29 and 30.

When the shaft 31 is rotated in the opposite direction to raise the plow, as may occur either by a signal from the draft sensor 14 because of excessive resistance in the soil or by movement of the control levers 29 and 30, this results in a rotation of the cam 39 in a clockwise direction as seen in FIGURE 2. When this is done, the raise cam surface 42 opens the raise control valve 55 to allow fluid to flow to the hydraulic cylinder 21. If the movement of the valve spool 103 is small, only a small flow will reach the cylinder and the plow will respond at a slow rate.

However, if the cam 39 is rotated through a considerable range of movement to move the valve spool 103 a greater distance to the right so that the conical metering surface 124 comes into operation, this movement of the valve spool 103 will allow such increased flow at a rate proportional to the amount of movement required as determined by displacement of the cam 39. As in the previous situation, when the plow has reached the desired position, the control box 26 will have rotated shaft 31 and cam 39 back to the neutral position within the dead band as shown in FIGURE 2 in which there is no flow through either valve.

With the arrangement of the control valve system shown in FIGURE 2, the system is particularly adapted to the aforesaid demand type of pump control. With a pump control of this type the control 46 is arranged to keep the pump operating at a relatively low output pressure of 200 to 400 p.s.i. and will maintain this output pressure in the absence of any pressure signal transmitted through the control line 47. However, when it is desired to raise the plow, the force encountered as determined by the pressure required in the hydraulic cylinder 21 to move the piston 22 may be greatly in excess of that pressure, being say on the order of 1500 p.s.i. When this is done, and the valve spool 103 moved to the right so as to allow free communication between the chambers 91 and 93, the relatively low output pressure from the pump will not be able to create any fluid flow past the check valve 57 which will therefore remain closed. However, the fluid will flow into the right chamber 93 and from there back through the line 75 to the counterbore 72 of the differential pressure regulator. This will then allow the fluid to continue to flow out through the control line 47 through the check valve 48 to the pump control 46 where it operates to increase the outlet pressure and volume of the pump. Where this is done the increased outlet pressure of the pump through line 51 is transmitted to the left chamber 91 of the raising control valve and will continue to flow through the metering orifice into the right chamber 93 because of the action of the differential pressure regulator which insures a fluid supply because of the fixed pressure differential. Thus, this fluid flow will continue to cause a pressure build up in the control line 47 so as to allow the pump control 46 to increase the output pressure of the pump until it is at least as great as the fluid pressure within the hydraulic cylinder 21 so that the check valve 57 may open and allow the required additional fluid to flow to the cylinder 21 until the implement is moved a sufficient distance so as to allow the control box 26 to restore the shaft 31 and hence cam 39 to the desired position. Thus, this system provides a feedback signal for the pump control to operate in the manner of a load responsive system, and the pump control 46 may then allow the pump to revert back to the low pressure output after equilibrium has been attained.

Figure 6:
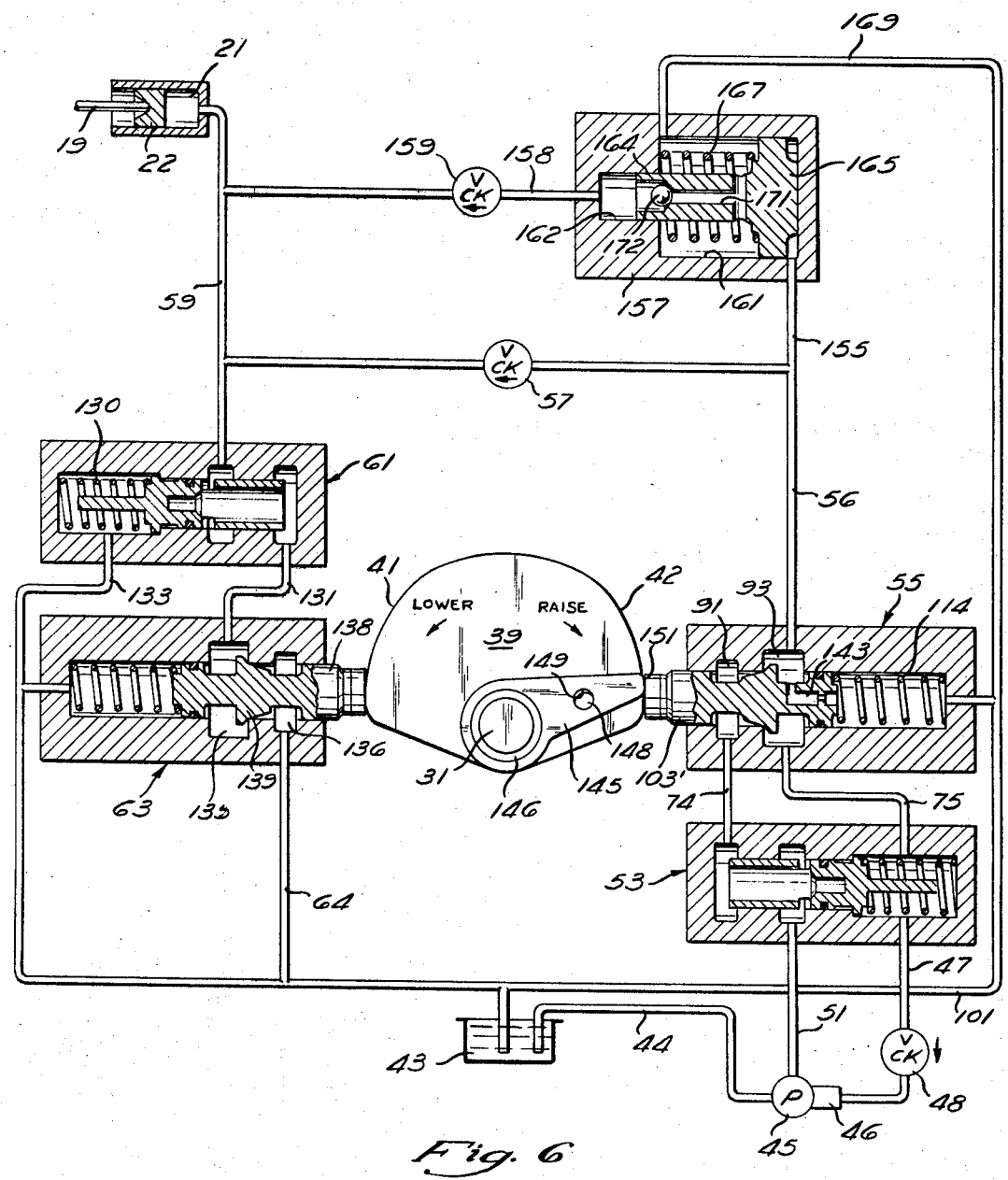
FIGURE 6 is a schematic circuit diagram of another embodiment of this invention incorporating a modified control cam arrangement and a hydraulic pressure intensifier.

An alternative arrangement of the invention incorporating several additional features is shown in FIGURE 6. This arrangement generally includes all of the structure of the system shown in FIGURE 2 but in addition has a delayed action cam finger on the raise cam and includes a pressure intensifier in the raise circuit.

The cam 39 is constructed with exactly the same lower and raise cam surfaces 41 and 42 but a modified cam action is provided by the delayed action finger 145 which is rotatably journalled on the shaft 31 by a suitable bearing 146. The finger 145 is drivingly connected to the cam 39 by means of a lost motion connection provided by a pin 148 secured to the cam 39 and extending into a slightly elongated slot 149 in the cam finger 145. Thus, movement of the cam finger 145 with respect to the cam 39 is limited to only a small arcuate extent as determined by the lost motion connection. At its outer end, the cam finger 145 has a cam surface 151 shaped in such a manner that when the finger is rotated in the counter clockwise direction with respect to the pin 148, as shown in FIGURE 6, this cam surface 151 will be coincident with the cam surface 42 on the main cam 39. Thus, when the shaft 31 is rotated to cause the cam 39 to rotate in a clockwise direction indicating that the raise control valve 55 is to supply fluid to the hydraulic cylinder 21, the cam finger 145 has no effect on the operation of the system. However, after sufficient fluid has been admitted to the hydraulic cylinder 21 to cause the shaft 31 and hence cam 39 to rotate back toward the neutral position, the friction between the cam follower 116 and the finger cam surface 151 will tend to rotate the cam finger 145 in a clockwise direction. Since the radius of cam surface 42 is decreased in this direction, the effect is to cause the cam surface 151 to project radially outward beyond the cam surface 42 when the cam finger 145 is rotated to a clockwise position with the pin 148 against the other end slot 149. This results in maintaining the raise control valve 55 in an open position beyond that determined by the cam surface 42 so that the shaft 31 is caused to rotate a slightly greater distance before the cam surface 151 becomes disengaged with the follower member 116, with the result that the plow is raised to a position at the upper end of the neutral or dead band range. This is done in order to compensate for the leakage which may take place in the system so that it will take a longer time for such leak down to take place and result in the plow dropping to a position that the raising action must take place again. Thus, this means that it is not necessary for the system including the pump and pump control to come into operation for only slight movements of the cam 39 and insures that when they do come into operation it will be for a longer period of time as determined by the shape of the cam surface 151 on the cam finger 145.

The arrangement in FIGURE 6 also includes a pressure intensifier in the raise circuit of the system. The intensifier in effect is connected in line 56 in parallel with the check valve 57 and includes a line 155 connected to line 56 between the raise control valve 55 and check valve 57 and leading to the intensifier housing 157. An outlet line 158 leads from the intensifier housing 157 to rejoin line 56 on the other side of check valve 57 between the check valve and the hydraulic cylinder 21. A check valve 159 is located in the outlet line 158 to prevent a reversal of flow from the hydraulic cylinder 21 back to the intensifier. With the intensifier the raise control valve has a modified valve spool 103' which differs only by having a restricted bleed passage 143 connecting chamber 93 with drain through counterbore 72.

The intensifier housing contains a large diameter bore 161 at one end of which is connected a smaller bore 162. The intensifier inlet line 155 enters into the end of large bore 161 away from the small bore 162, while the outlet line 158 leads out of the end of the small bore 162 away from the large bore 161. A piston 164 having the same diameter as the small bore 162 is slidably mounted in the small bore and extends into the large bore 161 where it has a head 165. A return spring 167 is mounted in the large bore 161 to engage the piston head 165 and move it to the right or intake position. In this position, the left end of large bore 161 is connected through an intake line 169 to the reservoir 43 so that this end of the bore will remain full of fluid. The small bore 162 is filled with fluid through the passages 171 formed in the piston 164 and reverse flow is prevented by the check valve ball 172. Thus, the intensifier will normally assume the position shown in FIGURE 6, with both of the bores filled with fluid at reservoir pressure. When the operation of the raise control valve delivers fluid into line 56, and the pump 45 is operating at its relatively low pressure level of several hundred pounds, the maximum pressure admitted to the line 56 may not be as high as that in the hydraulic cylinder 21 and therefore the check valve 57 will not open. However, under these circumstances, the fluid entering the intensifier housing 157 through line 155 will act on the large area of the piston head 165 and the multiplication of fluid pressure caused by the differential areas between the bores 161 and 162 will result in an outlet pressure in the outlet line 158 sufficient to open the check valve 159 and admit fluid pressure into the hydraulic cylinder 21. Of course, the intensifier has no means to recycle under these conditions and because of the relatively large area differential between the two bores the volume capacity of the intensifier is generally chosen to be sufficient merely to make small corrective movements in the hydraulic cylinder 21 rather than relatively large movements resulting from substantial movement of the cam 39. If the amount of fluid admitted to the cylinder 21 when the piston 164 bottoms is not sufficient to cause the cam 39 to return to the neutral position, then the pump outlet pressure will build up by action of the load responsive pump control 46, but normally this is not necessary for the small corrective movements.

After the fluid flow from the intensifier has acted on the cylinder 21 so as to return the cam 39 to the neutral position, then the fluid pressure in line 56 will drop because of the bleed through passage 143 and the return spring 167 will force the piston toward the right and the operation of the check valve 172 and the intake line 169 will allow both the large and small bores 161 and 162 to be refilled with fluid for the next operation.

It should be noted that in the system shown in FIGURE 6 the operation of the delayed action cam finger 145 and the fluid pressure intensifier are independent of each other and may each be employed individually without the other in combination with the rest of the circuit depending upon the requirements of the application of the system.

Although several preferred embodiments of this invention have been shown and described in detail, it is recognized that the invention is not limited to the precise forms and structure shown and various modifications and re-

I claim:

1. A fluid power system comprising a reservoir, a pump having an intake connected to said reservoir and an outlet, an expansible chamber fluid motor, first and second control valve means, said first control valve means being interposed between said pump outlet and said motor to control the fluid flow from said outlet to said motor, said second control valve means being interposed between said motor and said reservoir to control the fluid flow from said motor to said reservoir, each of said first and second control valve means including a flow control valve and a check valve to control the direction of fluid flow through said flow control valve, each of said first and second control valve means also including a differential pressure regulator on the inlet side of each flow control valve arranged to maintain a substantially constant pressure drop across the flow control valve, a rotary shaft and cam means on said shaft arranged to selectively operate said first and second control valve means.

2. A fluid power system comprising a reservoir, a pump having an intake connected to said reservoir and an outlet, an expansible chamber fluid motor, first and second control valve means, said first control valve means being interposed between said pump outlet and said motor to control the fluid flow from said outlet to said motor, said second control valve means being interposed between said motor and said reservoir to control the fluid flow from said motor to said reservoir, a pressure intensifier connected between said first control valve means and said motor and operable by fluid pressure from said pump to supply fluid to said motor at a pressure greater than the pressure at said pump outlet, a rotary shaft, and cam means on said shaft arranged to selectively operate said first and second control valve means.

3. A fluid power system comprising a reservoir, a pump having an intake connected to said reservoir and an outlet, an expansible chamber fluid motor, first and second control valve means, each of said control valve means including a movable valve member, said first control valve means being interposed between said pump outlet and said motor to control fluid flow from said outlet to said motor, said second control valve means being interposed between said motor and said reservoir to control the fluid flow from said motor to said reservoir, a rotary shaft, cam means on said shaft comprising first and second radial cam surfaces fixedly secured to said shaft and operatively engagable with the respective movable valve member of said first and second control valve means, said first cam surface for operating said first control valve means including a cam finger having a lost motion connection to allow limited rotary movement with respect to said first cam surface whereby the combined cam surfaces operate the first control valve means for a longer duration when said shaft is rotated in one direction than when said shaft is rotated in the opposite direction.

4. A control system for an implement mounted on a tractor by a linkage comprising a single acting hydraulic cylinder for raising the implement, a sensing member operable by said linkage, first and second cam surfaces unitarily movable by said sensing member, a reservoir, a pump having an intake connected to said reservoir and a high pressure outlet, first control valve means operable by said first cam surface and interposed between said pump outlet and said cylinder to control the admission of high pressure fluid from said pump to said cylinder, and second control valve means operable by said second cam surface interconnecting said cylinder and said reservoir to drain fluid from said cylinder to said reservoir.

5. A control system as set forth in claim 4 wherein said first and second cam surfaces are arranged so that in a neutral position said first and second control valve means are operable to maintain a balanced rate of flow from said pump outlet to said cylinder and from said cylinder to said reservoir, and movement of said sensing member from said neutral position in one direction increases the flow through said first control valve and decreases the flow through said second control valve, and movement in the opposite direction increases the flow through said second control valve and decreases the flow through said first control valve.

6. A control system for an implement mounted on a tractor by a linkage comprising a single acting cylinder for raising the implement, a rotatable shaft operable responsive to a signal from said linkage, first and second cams fixedly secured to said shaft, a reservoir, a pump having an intake connected to said reservoir and an outlet, a first balanced poppet flow control valve having a poppet operable by said first cam and arranged to open upon rotation of said shaft in one direction, said first valve being connected between the pump outlet and said cylinder to control the fluid flow from said pump to said cylinder to raise the implement, a check valve connected between said first control valve and said cylinder to prevent flow from said cylinder back to said first control valve, and a second balanced poppet flow control valve having a poppet operable by said second cam and arranged to open upon rotation of said shaft in the other direction to drain fluid from said cylinder.

7. A control system for an implement mounted on a tractor by a linkage comprising a single acting cylinder for raising the implement, a rotatable shaft operable responsive to a signal from said linkage, first and second radial cams fixedly secured to said shaft, a reservoir, a pump having an intake connected to said reservoir and an outlet, a first balanced poppet flow control valve having a poppet operable by said first cam and arranged to open upon rotation of said shaft in one direction, said first control valve being connected between the pump outlet and said cylinder to control the fluid flow from said pump to said cylinder to raise the implement, a first pressure regulator valve connected between said pump outlet and said first control valve to maintain a constant pressure differential across said first control valve, a check valve connected between said first control valve and said cylinder to prevent flow from said cylinder back to said first control valve, a second balanced poppet flow control valve having a poppet operable by said second cam and arranged to open upon rotation of said shaft in the other direction to drain fluid from said cylinder and a second pressure regulator valve connected between said cylinder and second control valve to maintain a constant pressure differential across said second control valve.

8. A control system as set forth in claim 7 including a pressure intensifier connected between the outlet of said first control valve and said cylinder and operable by fluid pressure from said first control valve to supply fluid to said cylinder at a pressure greater than the pressure at said pump outlet.

9. A control system as set forth in claim 7 including a cam finger rotatably mounted on said shaft adjacent said first cam to operate said first poppet, said cam finger having lost motion connection with said first cam to allow limited rotary movement with respect to said first cam, said cam finger at one end of said lost motion connection having a cam surface coincident with the cam surface on said first cam whereby upon rotation of said shaft in one direction said first control valve is operated by said first cam, and said cam finger at the other end of said lost motion connection extending beyond the cam surface on said first cam whereby rotation of said shaft in the opposite direction causes said cam finger to maintain said first control valve open for a longer duration of rotation of said shaft.

10. A control system as set forth in claim 7 wherein said poppets each are arranged to provide a substantially constant rate of flow under an initial range of opening movement and an increasing rate of flow when opened beyond said initial range.

11. A control system as set forth in claim 10 wherein said first and second cams are arranged so that within a deadband range both said first and second control valves are closed so that rotation of said shaft in one direction beyond said deadband increases the opening of said first control valve while said second control valve remains closed and rotation of said shaft in the opposite direction beyond said deadband increases the opening of said second control valve while said first control valve remains closed.

12. A control system for a tractor implement comprising a linkage mounting the implement on the tractor, a single acting cylinder for raising the implement, a rotatable shaft operable responsive to a signal from said linkage, first and second radial cams fixedly secured to said shaft, a reservoir, a variable displacement pump having an intake connected to said reservoir and an outlet, means to control the displacement of said pump, a first balanced poppet flow control valve having a poppet operable by said first cam and arranged to open upon rotation of said shaft in one direction, said first control valve being connected between the pump outlet and said cylinder to control the fluid flow from said pump to said cylinder to raise the implement, a first pressure regulator valve connected between said pump outlet and said first control valve to maintain a constant pressure differential across said first control valve, a check valve connected between said first control valve and said cylinder to prevent flow from said cylinder back to said first control valve, a second balanced poppet flow control valve having a poppet operable by said second cam and arranged to open upon rotation of said shaft in the other direction to drain fluid from said cylinder, a second pressure regulator valve connected between said cylinder and second control valve to maintain a constant pressure differential across said second control valve, and conduit means connected between said first control valve and said check valve to conduct a pressure feedback signal to said displacement control means to vary the displacement of said pump to maintain the pressure at said pump outlet above the pressure in said hydraulic cylinder when said first control valve is open.

13. A control system for an implement movably mounted on a tractor comprising an expansible chamber motor arranged for positioning the implement, a pump arranged to supply fluid under pressure to said motor, signal generating means arranged to supply a control signal in response to a condition of said implement, and control valve means interconnecting said pump and said motor to control fluid flow to and from said motor, said control valve means including first flow regulating means to control fluid flow from said pump to said motor in response to a change in said control signal above a selected signal level, said control valve means including a second flow regulating means to control fluid flow from said motor in response to a change in said control signal below a selected signal level whereby said control valve means maintains said signal at a selected level.

14. A control system as set forth in claim 13 including a pressure intensifier connected between said first flow regulating means and said motor and operable by fluid pressure from said pump to supply fluid to said motor at a pressure greater than the pressure supplied by said pump.

15. A control system as set forth in claim 13 including a lost motion means between said signal generating means and said first flow regulating means to maintain said implement above a position equivalent to said signal level thereby permitting unloading of said pump.

References Cited

UNITED STATES PATENTS 1,836,740 12/1931 Albers ........... 137—636.1 XR
2,726,680 12/1955 Baines ............ 137—636.1

EDGAR W. GEOGHEGAN, *Primary Examiner.*

U.S. Cl. X.R.

137—636.1; 91—457